United States Patent [19]

Cirri

[11] Patent Number: 5,252,265
[45] Date of Patent: Oct. 12, 1993

[54] METHOD FOR THE PRODUCTION OF MANUFACTURED ARTICLES OF RESIN OR COMPOSITE MATERIAL WITH A POLYMERIZABLE RESIN MATRIX USING ELECTRON BEAMS

[75] Inventor: Gianfranco Cirri, Florence, Italy
[73] Assignee: Proel Tecnologie, S.p.A., Florence, Italy
[21] Appl. No.: 873,364
[22] Filed: Apr. 24, 1992

[30] Foreign Application Priority Data

May 6, 1991 [IT]  Italy ................. FI91 A 000100

[51] Int. Cl.$^5$ ............................................. B29C 35/08
[52] U.S. Cl. .................................. 264/22; 264/255; 264/258; 264/347; 425/174.4
[58] Field of Search ............... 264/22, 171, 347, 255, 264/258; 425/174.4, 174.8 E

[56] References Cited

U.S. PATENT DOCUMENTS

| | | | |
|---|---|---|---|
| 2,668,133 | 2/1954 | Brophy et al. | 264/22 |
| 3,658,620 | 4/1972 | Hall | 264/22 |
| 4,361,606 | 11/1982 | Butler et al. | 264/22 |
| 4,571,316 | 2/1986 | Naruse et al. | 264/22 |
| 4,699,846 | 10/1987 | Ohya et al. | 264/22 |
| 4,789,505 | 12/1988 | Beziers | 425/174.4 |
| 5,063,005 | 11/1991 | Doheny, Jr. | 264/22 |

FOREIGN PATENT DOCUMENTS

| | | | |
|---|---|---|---|
| 46-6198 | 2/1971 | Japan | 264/347 |
| 1-148518 | 6/1989 | Japan | 264/22 |
| 2131324A | 6/1984 | United Kingdom | 264/22 |

*Primary Examiner*—Jeffery Thurlow
*Attorney, Agent, or Firm*—McGlew and Tuttle

[57] ABSTRACT

A technique is described for the production of manufactured articles of composite material of large thickness, the matrix of which is composed of polymerizable resins, using electron beams. To achieve the polymerization of the matrix, it is proposed to induce the adhesion of the resin of a layer (1) of already polymerized material with the resin of a second layer (3) to be polymerized by irradiating the second layer and the zone of adhesion between the first and the second layer with electron beams (F) of appropriate energy. The method can also be used for the welding of a plurality of layers or portions of already polymerized material. This permits the polymerization of matrices of such a thickness as not to be penetrated in a single phase by electron beams of limited energy. The treatment by successive phases performs the polymerization of the resin matrix in a manner equivalent to a simultaneous treatment over the entire thickness.

3 Claims, 1 Drawing Sheet

METHOD FOR THE PRODUCTION OF MANUFACTURED ARTICLES OF RESIN OR COMPOSITE MATERIAL WITH A POLYMERIZABLE RESIN MATRIX USING ELECTRON BEAMS

FIELD OF THE INVENTION

The invention relates to a method for the production of manufactured articles and structures of resin or composite material with a polymerizable resin matrix using electron beams.

BACKGROUND OF THE INVENTION

In order to obtain the polymerization or cross-linking reaction in polymerizable resins, use is conventionally made of a thermal method.

This method exhibits significant disadvantages, especially on account of the thermal gradients and thus of the thermal stresses induced by the treatment of the material. Moreover, the need to arrange the manufactured article in a suitable oven limits the dimensions of the manufactured article which can be obtained using this method.

For the purpose of overcoming the disadvantages of the thermal processes, there has recently been proposed the use of electron beams for the polymerization of resins which exhibit high levels of reactivity to the formation of cross-linking bonds by means of irradiation using electron beams. This technique has already been extensively investigated experimentally in the field of the production of protective coatings of paper or wood and in the treatment of inks, lacquers and the like, and moreover is the subject of investigation in the polymerization of the resin matrix for the production of composite materials.

The process of polymerization by irradiation using electron beams exhibits significant advantages as compared with the conventional thermal methods. In fact, the technique employing electron beams permits the polymerization to be achieved in very short periods of time and without inducing structural deformations due to thermal effects, as does, however, happen in the processes of polymerization by heating.

Moreover—in contrast to the thermal processes, in which the entire structure subjected to polymerization is treated in a homogeneous manner—the technique involving irradiation using electron beams permits the localization of the treatment, very precisely focusing the electron beam selectively in the desired zone. The possibility of using the electron beam to "brush" the surface of the structure to be polymerized permits an enhanced ease of treatment of parts of large dimensions.

Notwithstanding the aforementioned advantages, the technology involving electron beams exhibits a considerable limit due to the high beam energy required to pass through the thickness of the material to be polymerized. The thickness which can be penetrated by the electron beams is essentially dependent upon the energy of the beam and upon the density of the material. Using z (a quantity referred to as the "specific thickness" or "surface mass") to designate the product of the density of a material (in g/cm$^3$) and the thickness of said material (in cm), the relation between the energy $V_B$ of the electron beam (expressed in eV) and the specific thickness z penetrated by the electron beam is approximately given by:

$$z(g/cm^2) = 5.1 \times 10^{-7} V_B - 0.26$$

This relation is valid for beam energies equal to or greater than 1 MeV.

Using a 10 MeV accelerator (this being a considerable energy for this type of application, as the electron accelerators normally employed for industrial applications do not exceed 5 MeV), the specific thickness (z) which can be treated is approximately 4.8 g/cm$^2$. By way of example, assuming a density of the resin of 1 g/cm$^3$, the thickness which can be treated is approximately 4.8 cm. On the other hand, in the case of a high density, for example 4.8 g/cm$^3$, the thickness which can be treated is reduced to 1 cm.

The problem of the limitation with regard to the thickness which can be treated using electron beams arises in particular in the case of composite-material structures, the specific thickness z of which may locally exceed 4–5 g/cm$^2$.

A method was recently proposed (U.S. Pat. No. 4,789,505) which combines polymerization using electron beams (for specific thickness values below 4 g/cm$^2$) with polymerization using X-rays (for greater thicknesses) which are obtained by interposing a metal target between the electron generator and the material to be treated. The electron beam strikes the metal target, generating X-rays. The interaction between the X-rays and the resin initiates the polymerization reaction by means of the ionization induced by the release of energy within the matrix. This method exhibits numerous disadvantages. In fact, the generation of X-rays as a result of the bombardment of the target by the electron beam is a process which has a low yield, so that it becomes necessary to use generators of high energy (in the order of 10 MeV) and considerable power (at least 10 kW) in order to generate X-rays of sufficient intensity. This involves significant equipment costs and necessitates the adoption of pertinent radio protection measures.

Moreover, the X-rays employed for the polymerization cannot be focused onto a particular area of the matrix, and accordingly the advantage of treating selected zones of the material is lacking.

SUMMARY AND OBJECTS OF THE INVENTION

The subject of the present invention is a method for the polymerization of resins for the production of manufactured articles or structures of polymeric resin or of composite material or the like, which exhibits the advantage of the technique involving an electron beam but which does not have the specific disadvantages of such a technique.

In substance, according to the invention a method is used for the polymerization of polymerizable resins using electron beams, in which there is applied to a layer of already polymerized resin a further layer of resin (the same as or different from the previous one) of thickness such as to be polymerizable using an electron beam. By this method, it is possible to obtain the polymerization of material, for example of the matrix of large thicknesses of composite material, by accumulation of a plurality of superposed layers, which are treated successively with electron beams in order to obtain the polymerization of the successive layers.

The method according to the invention is based on the recognition of the fact that by applying a second layer of resin to be polymerized to a first layer of already polymerized resin and subsequently polymerizing said second layer, the material which is obtained exhibits complete cohesion (without any discontinuities) in the region of the surface of transition between the first and the second layer. The irradiation, using electron beams, of the second layer of resin to be polymerized and of the zone of contact between the polymerized resin of the first layer and the resin to be polymerized, gives rise to a phenomenon of polymerization and/or of cross-linking with the formation of bonds between the first and the second layer.

Although in the foregoing text reference has been made to layers of polymerizable resin which are successively superposed, the method of the present invention may also be employed for the production of structures of a different form, as will become evident more clearly from the description which follows.

The proposed technique permits the treatment even of large thicknesses (specific thickness exceeding 4 $g/cm^2$) of composite material with a matrix of resin or of pure resin (reactive to irradiation with electron beams), through the accumulation of the thickness, which is obtained by the superposition of a plurality of layers of material which are treated in succession with electron beams of relatively moderate energy. By way of example, specific thicknesses of 5 $g/cm^2$ may be obtained by the described technique through the accumulation of five layers of 1 $g/cm^2$ which are treated using an approximately 2.5 MeV electron generator.

In any event, the method according to the invention permits the utilization of all the advantages of electron beam technology (short treatment times, possibility of focusing the beam and thus of treating defined areas, absence of thermal deformation effects), without limitations on the thickness of the final material and using substantially reduced beam energies.

Further advantageous embodiments of the method according to the invention are indicated in the attached claims.

BRIEF DESCRIPTION OF THE DRAWINGS

The invention will be better understood on the basis of the description and the accompanying drawing, which shows non-limiting practical illustrations of said invention. In the drawing.

DETAILED DESCRIPTION OF THE INVENTION

Figure 1:
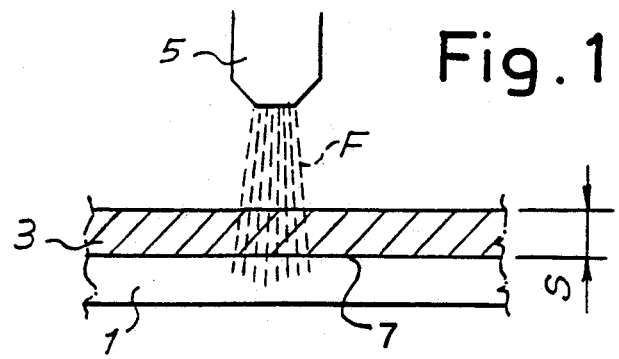
FIGS. 1 and 2 show an illustrative scheme illustrating a first embodiment of the method according to the invention, for the formation of a layer of polymerized material of large thickness.
Figure 2:
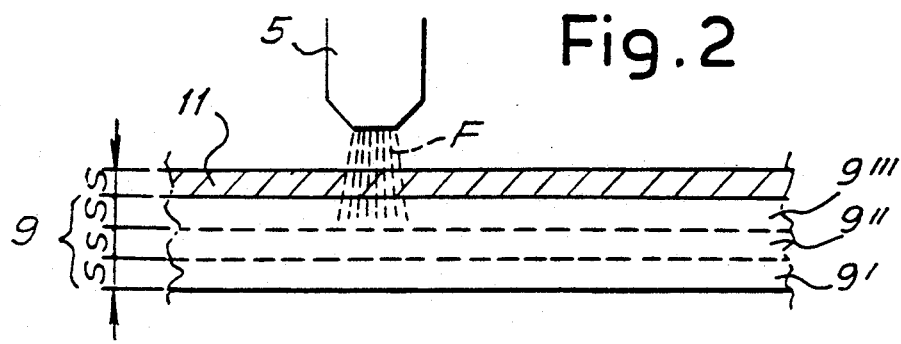

FIGS. 1 and 2 show a first example of application of the method according to the invention, for the accumulation of a layer of resin, which layer is already polymerized, with a layer to be polymerized. On a completely general note, the layers of resin may be pure, or may constitute the matrix of composite materials, for example reinforced with fibers or the like.

In FIG. 1, the reference 1 indicates a first layer of resin, which layer is already polymerized, to which there has been applied a layer 3 of resin to be polymerized. The reference 5 generally and diagrammatically indicates the electron gun which generates the electron beam employed to trigger the polymerization reaction. The electron beam F has an energy such as to penetrate the layer 3, the thickness of which is indicated by s, and in part the already polymerized layer 1. In this manner, the surface 7 of contact between the layer 1 and the layer 3 is irradiated with the electron beam F. The irradiation, in addition to causing the polymerization and/or the cross-linking of the layer 3, also induces the formation of cross-linking bonds between the polymerized resin of the layer 1 and the resin to be polymerized of the layer 3.

This gives the polymerization of the layer 3 which, from being fluid, becomes solid, and the adhesion of such a layer 3 to the subjacent layer 1 which has previously been polymerized. FIG. 2 shows the material in a subsequent working phase, in which to a polymerized layer 9 there has been applied a further layer 11 of resin to be polymerized, which is irradiated with the electron beam F. The layer 9 is composed of a plurality of layers of thickness s, which are indicated by 9', 9'', 9''', and which are obtained by successive accumulation. The surfaces of separation between the layers 9', 9'', 9''' are indicated by broken lines, since in practice no discontinuity in the region of said surfaces can be detected.

In an experimental trial, use was made of a 5 meV accelerator to polymerize in succession two layers, each having a thickness of 2 cm, and made of epoxide and polyurethane acrylate resins (density approximately 1.19 and 1.12 $g/cm^2$ respectively). The method gave optimal results both upon superposing two layers of the same resin on one another and upon superposing in succession two layers of different resins.

Figure 3:
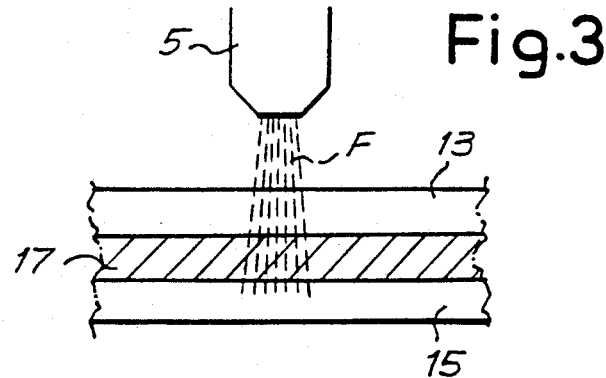
FIG. 3 shows an illustrative scheme of a second embodiment of the method according to the invention, for the welding of a plurality of layers of polymerized material.

The method according to the invention may advantageously be employed also for the mutual welding of layers or portions of structures of polymerized resin or composite material. This type of application is diagrammatically indicated in FIG. 3. The references 13 and 15 indicate two layers of already polymerized resin, between which there is interposed a layer 17 of resin to be polymerized. The electron beam F originating from the electron gun 5 triggers the polymerization reaction of the layer 17 and the cross-linking reaction between said layer and the adjacent layers 13, 15. In this case also, the final product is substantially free from discontinuities and it is not possible to detect any transition zone between adjacent layers.

Figure 4:
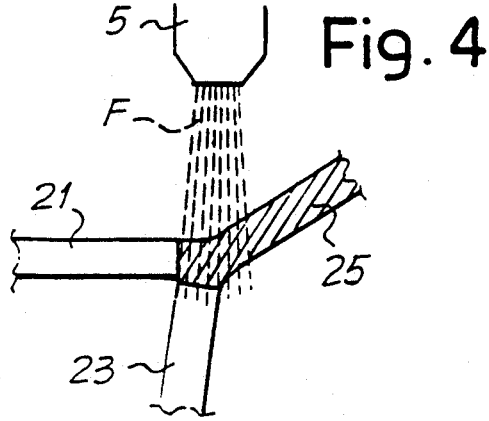
FIGS. 4 and 5 show illustrative schemes illustrating applications of the method to the production of complex structures.

In the foregoing text, reference has been made to the accumulation of successive layers or to the welding of superposed layers. However, the method according to the invention may also be employed to join a plurality of structures of polymerizable resin of various forms, or to effect the accumulation of structures of resin of complex form. FIG. 4 shows an example of application in which two already polymerized structures, which are indicated by 21 and 23 respectively, are joined to a structure 25 of resin to be polymerized. The electron beam F originating from the gun 5 attacks the junction zone between the structures 21 and 23 to give rise to cross-linking and thus to the polymerization of the resin of the structure 15. With the subsequent relative movement between the beam F and the structure 25 to be polymerized there is supplied to the latter the energy per unit mass required in order to obtain the polymerization reaction.

Figure 5:
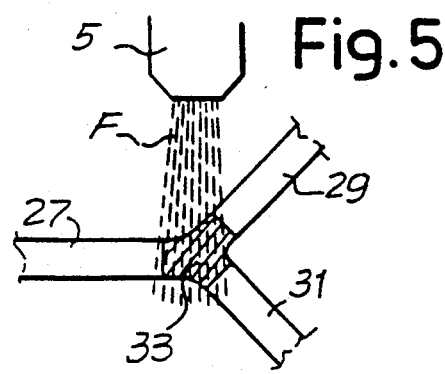

FIG. 5 diagrammatically illustrates the application of the method according to the invention to the mutual welding of three structures 27, 29, 31 which have already been polymerized. To this end, there is inserted between the three structures a knot 33 of polymerizable material, which is then irradiated with the electron beam F in order to give rise to cross-linking and/or to polymerization.

The technique described has been experimentally investigated with various types of resin which is polymerizable by means of an electron beam, and in particular with epoxide and polyurethane acrylate resins.

The welding between the successive layers has been checked both by traction tests and by observation using a scanning electron microscope. The fracture of the resin sample in the traction tests took place, in all the specimens, in the region of points which did not form part of the join zone between successive layers, while when using the microscope no discontinuity was observed in the transition zone between successive layers. In particular, when using the microscope no difference was observed between a specimen made by the polymerization of a single layer and a specimen made by polymerization of successive layers.

The described technique places considerable importance on the production of composite materials, as it permits the welding, in successive stages, of the matrices of various parts and/or layers of the material or of the structure to be produced. This also permits the production of structures of large dimensions, which can be subdivided into a plurality of parts which are welded together by a process, the result of which is a homogeneous polymerized structure which is free of transition zones between adjacent parts which have been welded to one another.

Moreover, the method according to the invention permits the production of layers and structures, the thickness of which (and of which the specific thickness as defined hereinabove) would not be polymerizable by the conventional methods using an electron beam.

It will be understood that the drawing only shows an exemplification given solely by way of practical demonstration of the invention, it being possible for this invention to vary in its forms and arrangements without thereby departing from the scope of the concept which forms said invention.

I claim:

1. A method for the polymerization of resins using electron beams, comprising:
    a) producing a first layer or a portion of a first layer of curable or polymerizable resin, said first layer having a thickness limited dependent upon power of an electron beam producing apparatus to be used;
    b) completely curing or polymerizing said layer or portion of said layer by means of an electron beam produced by said electron beam producing apparatus;
    c) applying on said already polymerized layer or portion of said layer, a further layer or a portion of a further layer of polymerizable resin, said further layer having a thickness limited dependent upon power of the electron beam producing apparatus;
    d) completely curing or polymerizing said further layer or portion of said further layer applied on said already polymerized layer by the electron beam produced by said electron beam producing apparatus by directing the beam toward said further layer on the side of said further layer to form a substantially homogenous thicker layer or portion of a substantially homogenous thicker layer, said substantially homogenous thicker layer including said first and said further polymerized layers or portions of said first and further polymerized layers, molecular linking being obtained through the boundary surface between said first and said further layer or portion; and
    e) repeating steps c and d above as necessary until a desired final thickness of a homogenous polymerized resin structure is obtained.

2. A method for the polymerization of resins using electron beams, comprising the steps of:
    a) providing a first portion of an already polymerized resin;
    b) providing a second portion of already polymerized resin;
    c) applying an intermediate portion of polymerizable resin between said first and said second portion of already polymerized resin;
    d) curing or polymerizing said intermediate portion of polymerizable resin arranged between said first and said second portions of already polymerized resin by means of an electron beam directed through one of said first and second portions of already polymerized resin to form a homogenous structure from said first and second portions and said intermediate portion, molecular linking being obtained through a boundary surface between said first portion and said intermediate portion and between said intermediate portion and said second portion;
    e) and repeating steps b, c and d above as necessary until a desired final thickness of a homogenous structure is obtained.

3. A method for the polymerization of resins using electron beams, comprising:
    a) producing a first layer or a portion of a first layer of curable or polymerizable resin, said first layer having a thickness limited dependent upon power of an electron beam producing apparatus to be used;
    b) completely curing or polymerizing said layer or portion of said layer by means of and electron beam produced by said electron beam producing apparatus;
    c) applying on said already polymerized layer or portion of said layer, a further layer or a portion of a further layer of polymerizable resin, said further layer having a thickness limited dependant upon power of the electron beam producing apparatus;
    d) completely curing or polymerizing said further layer portion of said further layer applied on said already polymerized layer by the electron beam produced by said electron beam producing apparatus by directing the beam toward said further layer on one of a side of said further layer or on a side of said first layer to form a substantially homogenous thicker layer or portion of a substantially homogenous thicker layer, said substantially homogenous thicker layer including said first and said further polymerized layers or portions of said first and further polymerized layers, molecular linking being obtained through the boundary surface between said first and said further layer or portion; and
    e) repeating steps c and d above as necessary until a desired final thickness of polymerized resin is obtained.

* * * * *